(No Model.)

G. J. CLINE.
WIRE STRETCHER.

No. 517,842. Patented Apr. 10, 1894.

Witnesses:

Inventor
Geo. J. Cline
By James J. Sheehy
Attorney

THE NATIONAL LITHOGRAPHING COMPANY,
WASHINGTON, D. C.

UNITED STATES PATENT OFFICE.

GEORGE J. CLINE, OF GOSHEN, INDIANA.

WIRE-STRETCHER.

SPECIFICATION forming part of Letters Patent No. 517,842, dated April 10, 1894.

Application filed January 19, 1894. Serial No. 497,348. (No model.)

*To all whom it may concern:*

Be it known that I, GEORGE J. CLINE, a citizen of the United States, residing at Goshen, in the county of Elkhart and State of Indiana, have invented certain new and useful Improvements in Wire-Stretchers; and I do declare the following to be a full, clear, and exact description of the invention, such as will enable others skilled in the art to which it appertains to make and use the same.

My invention relates to improvements in that class of wire stretchers which are designed to be placed upon the end posts of fences to tighten the wires thereof; and it has for its general object to provide such a stretcher of an exceedingly cheap, simple, and durable construction, and one embodying a simple and highly efficient latch which will not interfere with the rotation of the spool in a direction to tighten the wire, but will effectually prevent rotation of the spool in the opposite direction.

With the foregoing ends in view, the invention will be fully understood from the following description and claims when taken in connection with the annexed drawings, in which—

Figure 1:
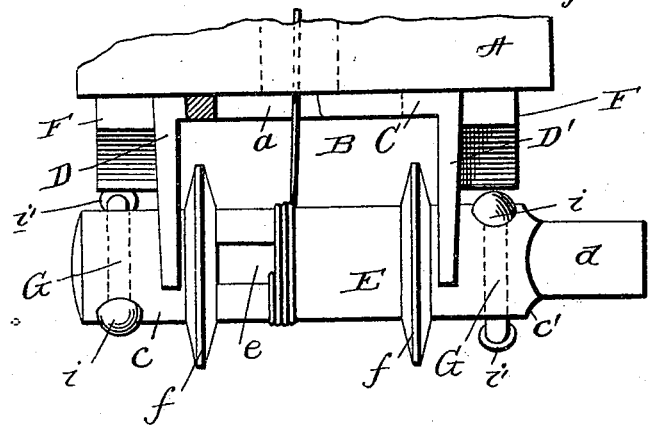
Figure 2:
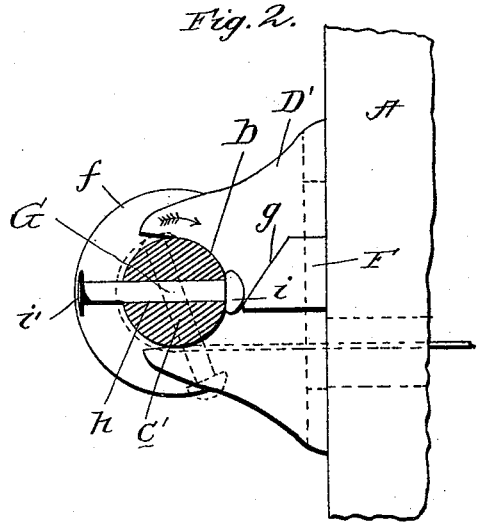
Figure 3:
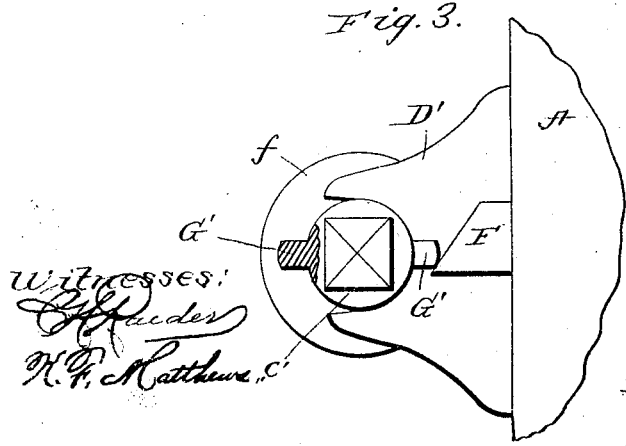

Figure 1, is a plan view of my stretcher in an operative position upon a fence post. Fig. 2, is a side elevation of the same with one of the trunnions of the spool in section to better illustrate the gravitating latch, and Fig. 3, is a side elevation illustrating a modified construction.

Referring by letter to said drawings, and more particularly to Figs. 1, and 2, thereof:—A, indicates a fence post or the like, and B, indicates the main frame of my improved stretcher, which may be connected to the post in any approved manner. This frame B, is preferably cast or otherwise formed in one piece as better shown in Fig. 1, and it comprises the plate C, having an aperture $a$, for the passage of the wire, and the brackets D, D′, which are provided with bearings $b$, for the trunnions $c$, $c'$, of the spool E, as shown. The said spool E, which may be turned by a crank applied to the squared end $d$, of its trunnion $c'$, is preferably provided with a slot $e$, to permit of a ready fastening of the wire, and is also provided with peripheral flanges $f$, to prevent endwise play of the spool and keep the wire within proper limits.

F, indicates keeper lugs which are arranged upon the outside of the brackets D, D′, between the trunnions $c$, $c'$, and the post A, and are preferably formed integral with said bracket as shown. These lugs F, are designed and adapted to engage the gravitating latches G, of the spool so as to hold the spool securely against rotation in one direction, and they have their forward ends beveled as shown at $g$, in order to enable the latches to ride freely past them when the spool is turned in the direction of the arrow to wind the wire. The said latches are loosely arranged in diametrical bores $h$, formed in the trunnions $c$, $c'$, and they are provided at their ends with heads $i$, $i'$, in order to prevent them from dropping out of the bores $h$, when they assume a vertical position. One of the heads $i'$, of the latches G, may be of any suitable form, but the other heads $i$, which engage the beveled ends $g$, of the keeper lugs, are rounded as illustrated in order to enable them more readily to take upon and move over the said beveled ends.

The bores $h$, in the trunnions $c$, $c'$, are preferably disposed at an angle to each other as illustrated in order that one or the other of the latches G, may engage its keeper at each quarter turn of the spool, for obvious reasons.

By reason of the construction described, it will be perceived that when the spool is turned in the direction of the arrow, to wind and tighten the wire, the heads $i$, of the latches, will engage the beveled ends $g$, of the keeper lugs which will push the said heads against the trunnions so as to enable them to pass the keeper lug. When however the crank is removed from the trunnion of the spool immediately after the head $i$, of one of the latches has passed its lug F, it will be seen that the said head will engage the under side of the lug and will effectually prevent rotation of the spool in a direction opposite to that indicated by arrow. When the crank is removed from the trunnion of the spool while the end of either of the latches carrying the head $i'$, is extended, the said end will engage the under side of the keeper lug to prevent casual rotation of the spool and a consequent loosening of the wire. It will also be understood from the foregoing that my improved latch is absolutely automatic in its action and that one or the other of the ends of one latch, will engage the under side of the keeper lug as soon as the spool commences to turn in an opposite direction.

In Fig. 3, I have disclosed a modified construction comprising two fixed latches G', upon the trunnions c, c', instead of the gravitating latches G. These fixed latches G', are preferably formed integral with and extend from the trunnions at diametrically opposite points and they are designed to ride over and past the beveled end of the keeper lugs F, when the spool is turned in the direction indicated by arrow and are also adapted to engage the under side of said lug when the spool is released, so as to prevent casual rotation in a direction opposite to that indicated. The latches G', of one trunnion are also disposed at an angle to those of the other for the purpose before described.

Having described my invention, what I claim is—

1. In a wire stretcher, the combination with a frame comprising a plate and brackets having bearings as b, and a keeper lug arranged upon the frame and having its free end beveled; of a spool having trunnions journaled in the bearings b, of the brackets, and a gravitating latch loosely arranged in a diametrical bore formed in one of the trunnions of the spool; the said latch being adapted to engage the keeper lug, substantially as and for the purpose set forth.

2. In a wire stretcher, the combination with a frame comprising a plate and brackets having bearings as b, and a keeper lug arranged upon the frame and having its free end beveled; of a spool having trunnions journaled in the bearings b, of the brackets, and a gravitating latch loosely arranged in a diametrical bore formed in one of the trunnions of the spool and having a head i', at one end and a rounded head at its opposite end, substantially as specified.

In testimony whereof I affix my signature in presence of two witnesses.

GEORGE J. CLINE.

Witnesses:
ELIAS D. SALSBURY,
GLADYS D. HEAGY.